US012044055B2

(12) United States Patent
Alneri et al.

(10) Patent No.: US 12,044,055 B2
(45) Date of Patent: Jul. 23, 2024

(54) HANDLE FOR OPERATING AN AUTOMATIC MOVING MECHANISM OF A DOOR OF A MOTOR VEHICLE

(71) Applicant: FERRARI S.P.A., Modena (IT)

(72) Inventors: Stefano Alneri, Modena (IT); Ivan Moranzoni, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 18/170,590

(22) Filed: Feb. 17, 2023

(65) Prior Publication Data

US 2023/0265707 A1 Aug. 24, 2023

(30) Foreign Application Priority Data

Feb. 24, 2022 (IT) ........................ 102022000003422

(51) Int. Cl.

*E05F 15/73* (2015.01)
*E05B 85/18* (2014.01)
*E05F 15/60* (2015.01)

(52) U.S. Cl.

CPC .............. *E05F 15/73* (2015.01); *E05B 85/18* (2013.01); *E05F 15/60* (2015.01); *E05Y 2400/44* (2013.01); *E05Y 2400/86* (2013.01)

(58) Field of Classification Search

CPC .......... E05F 15/73; E05F 15/60; E05B 85/18; E05B 81/00; E05B 81/02; E05B 81/01; E05B 81/04; E05B 81/20

See application file for complete search history.

(56) References Cited

U.S. PATENT DOCUMENTS 8,002,328 B2 * 8/2011 McKee ................... E05F 15/60 49/31
8,132,844 B2 * 3/2012 Sonnek ................... F41H 5/226 296/146.4

(Continued)

FOREIGN PATENT DOCUMENTS

WO 2021075301 A1 4/2021

OTHER PUBLICATIONS

Italian Search Report for Application No. 102022000003422; Filing Date—Feb. 24, 2022; Date of Mailing—Sep. 27, 2022, 26 pages.

*Primary Examiner* — Justin B Rephann
(74) *Attorney, Agent, or Firm* — CANTOR COLBURN LLP

(57) ABSTRACT

A handle for a door of a motor vehicle includes an attachment portion to be fixed to the door of the motor vehicle, a maneuverable portion coupled to the attachment portion in a movable manner between at least three distinct positions including a neutral position, a first activation position, and a second activation position, and a transducer device configured to detect a first movement of the manoeuvrable portion reaching the first activation position, generate a first signal to trigger an automatic opening of the door by means of an actuator device of the motor vehicle when the first movement is detected, and detect a second movement of the manoeuvrable portion reaching the second activation position, wherein the transducer device is further configured to generate a second signal to trigger an automatic closing of the door by means of the actuator device when the second movement is detected.

12 Claims, 14 Drawing Sheets

(56) References Cited

U.S. PATENT DOCUMENTS

| | | | | |
|---|---|---|---|---|
| 8,506,002 | B2 * | 8/2013 | Sonnek | E05F 15/70 296/146.4 |
| 9,004,552 | B2 * | 4/2015 | Sonnek | E05F 15/70 292/336.3 |
| 10,745,935 | B2 * | 8/2020 | Coster | E05B 7/00 |
| 2011/0302842 | A1 | 12/2011 | Sonnek | |
| 2012/0175893 | A1 * | 7/2012 | Sonnek | F41H 5/226 292/144 |
| 2014/0365080 | A1 | 12/2014 | Hirota et al. | |

* cited by examiner

HANDLE FOR OPERATING AN AUTOMATIC MOVING MECHANISM OF A DOOR OF A MOTOR VEHICLE

CROSS-REFERENCE TO RELATED APPLICATIONS

This patent application claims priority from Italian Patent Application no. 102022000003422 filed on Feb. 24, 2022, the entire disclosure of which is incorporated herein by reference.

TECHNICAL FIELD

The invention relates to a handle for a door of a motor vehicle, in particular for a side door of the motor vehicle.

PRIOR ART

Typically, a side door of a motor vehicle is provided with a handle allowing a user to open the door and enter the passenger compartment of the motor vehicle.

In some cases, the handle is coupled to an automatic moving mechanism to open the door.

The user can then use the handle to provide the moving mechanism with an input signal that triggers the automatic opening of the door.

Here, more precisely, the opening is understood as a rotation or movement of the door about a hinge axis towards the outside of the motor vehicle.

In general, there is a need to improve the known handles for controlling the automatic movement of the door.

More particularly, there is also a need to provide the user with a reaction response of the handle to the handling thereof in a programmed way.

For example, a desirable reaction response would include an initial increase in a reaction force of the handle substantially proportional to its movement, plus a momentary decrease in the reaction force at the moment the door is triggered to open.

The object of the invention is to meet at least one of the above needs, preferably in a simple and reliable way.

DESCRIPTION OF THE INVENTION

The object is achieved by means of a handle for a door of a motor vehicle, as defined in claim 1.

The dependent claims define particular embodiments of the invention.

BRIEF DESCRIPTION OF THE DRAWINGS

To better understand the invention, one embodiment thereof is described hereinafter by way of non-limiting example and with reference to the accompanying drawings, wherein.

EMBODIMENTS OF THE INVENTION

Figure 1:
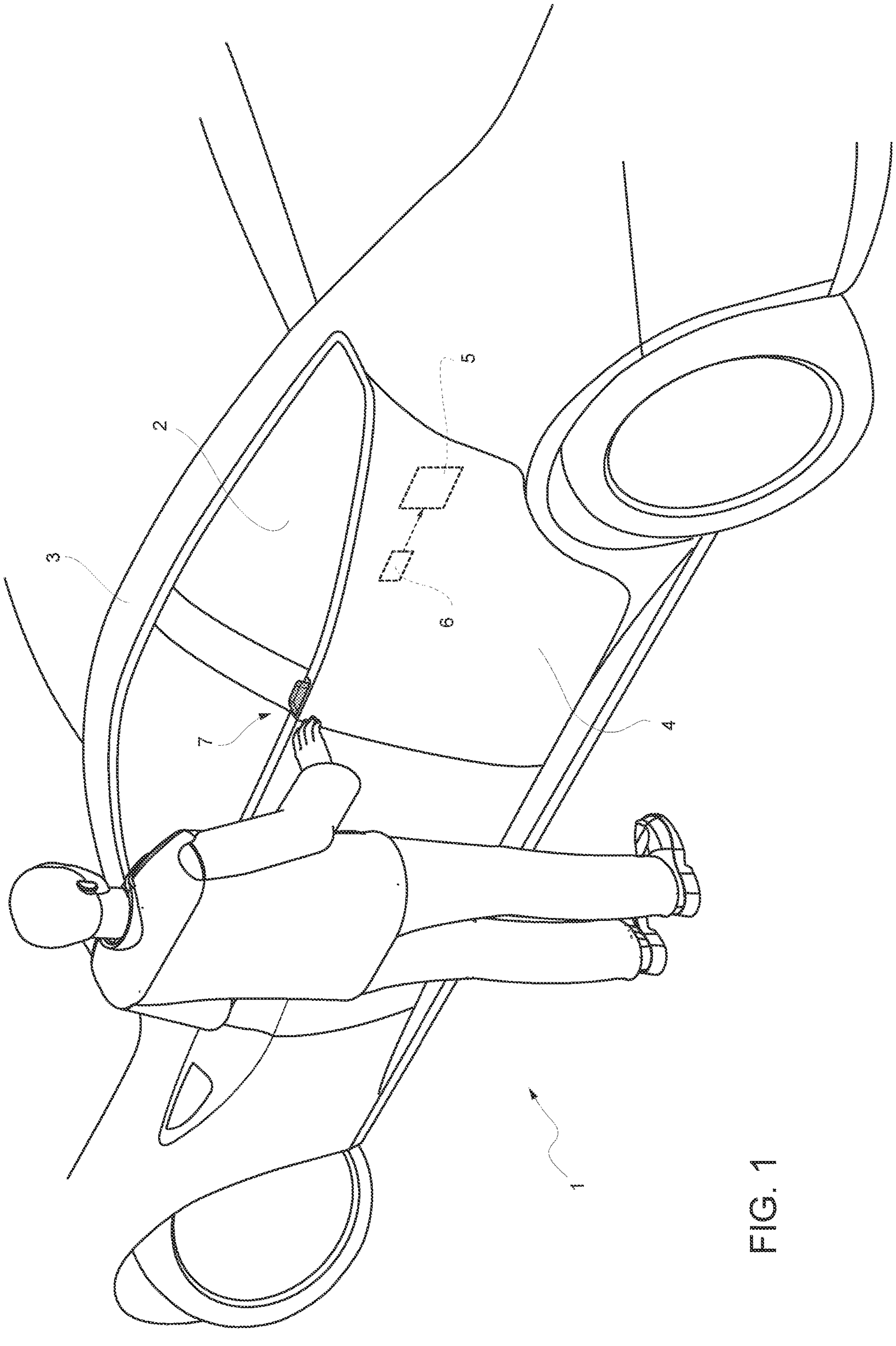
FIG. 1 is a perspective view of a motor vehicle comprising a handle according to the invention.
Figure 2:
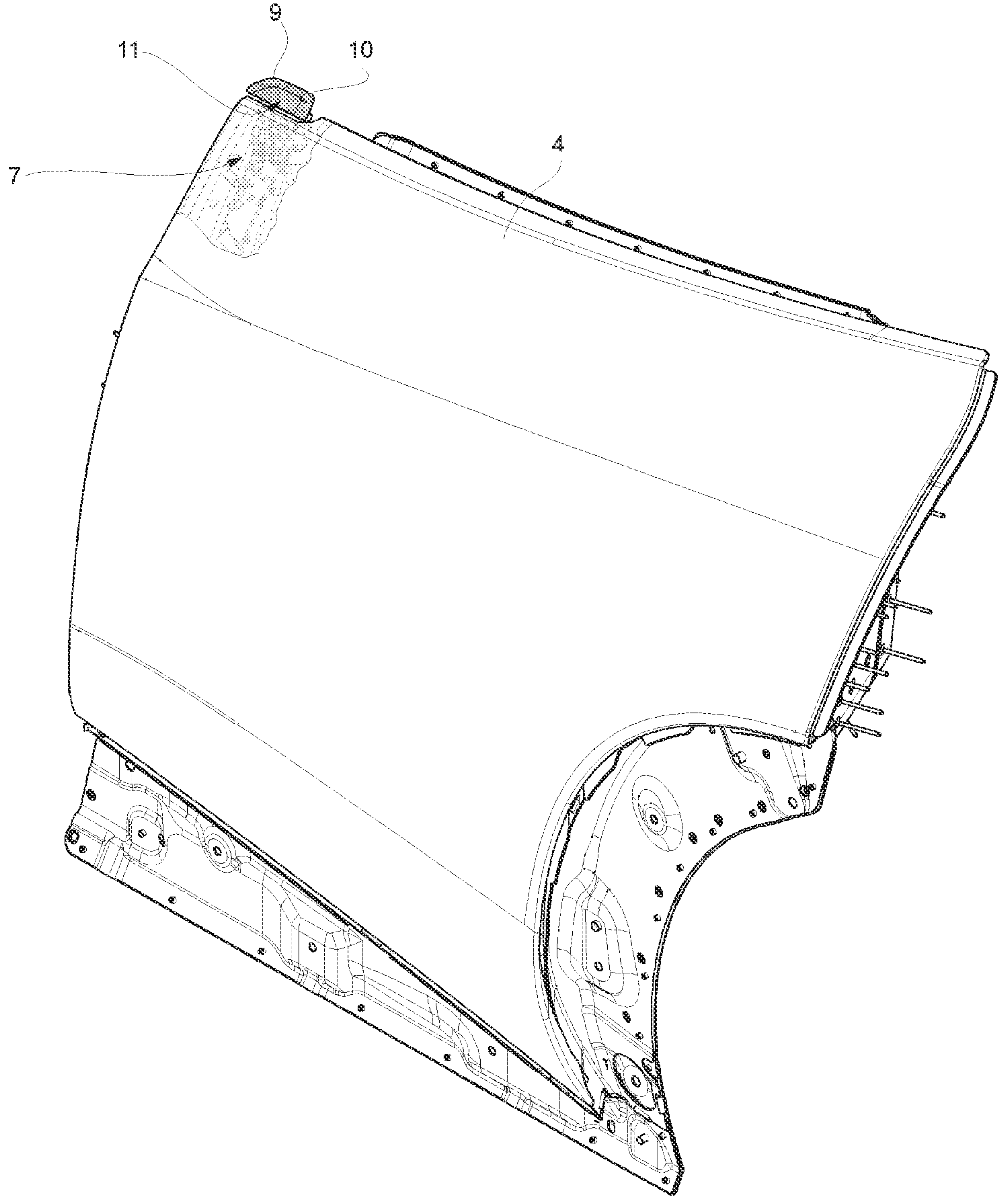
FIG. 2 is a perspective view of a door of the motor vehicle in an enlarged scale and with parts in transparency for clarity.
Figure 3:
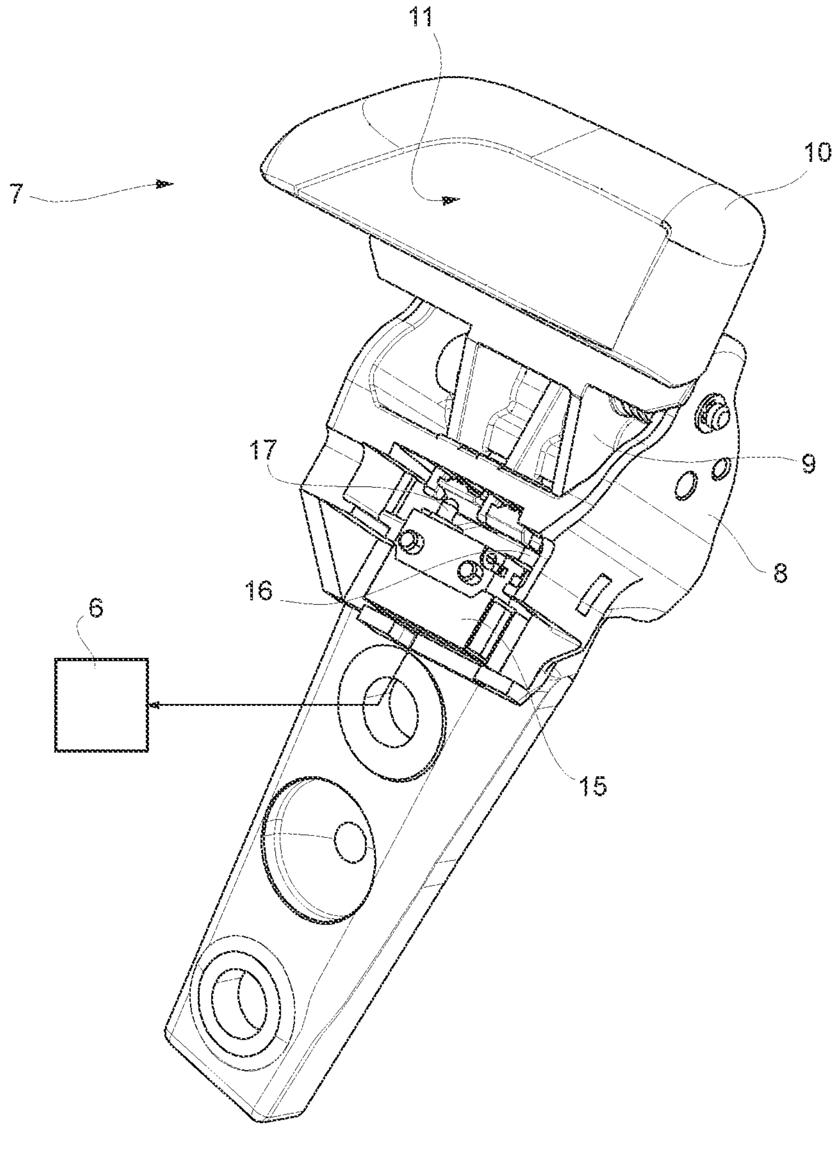
FIG. 3 is a perspective view of the handle, in a further enlarged scale.
Figure 4:
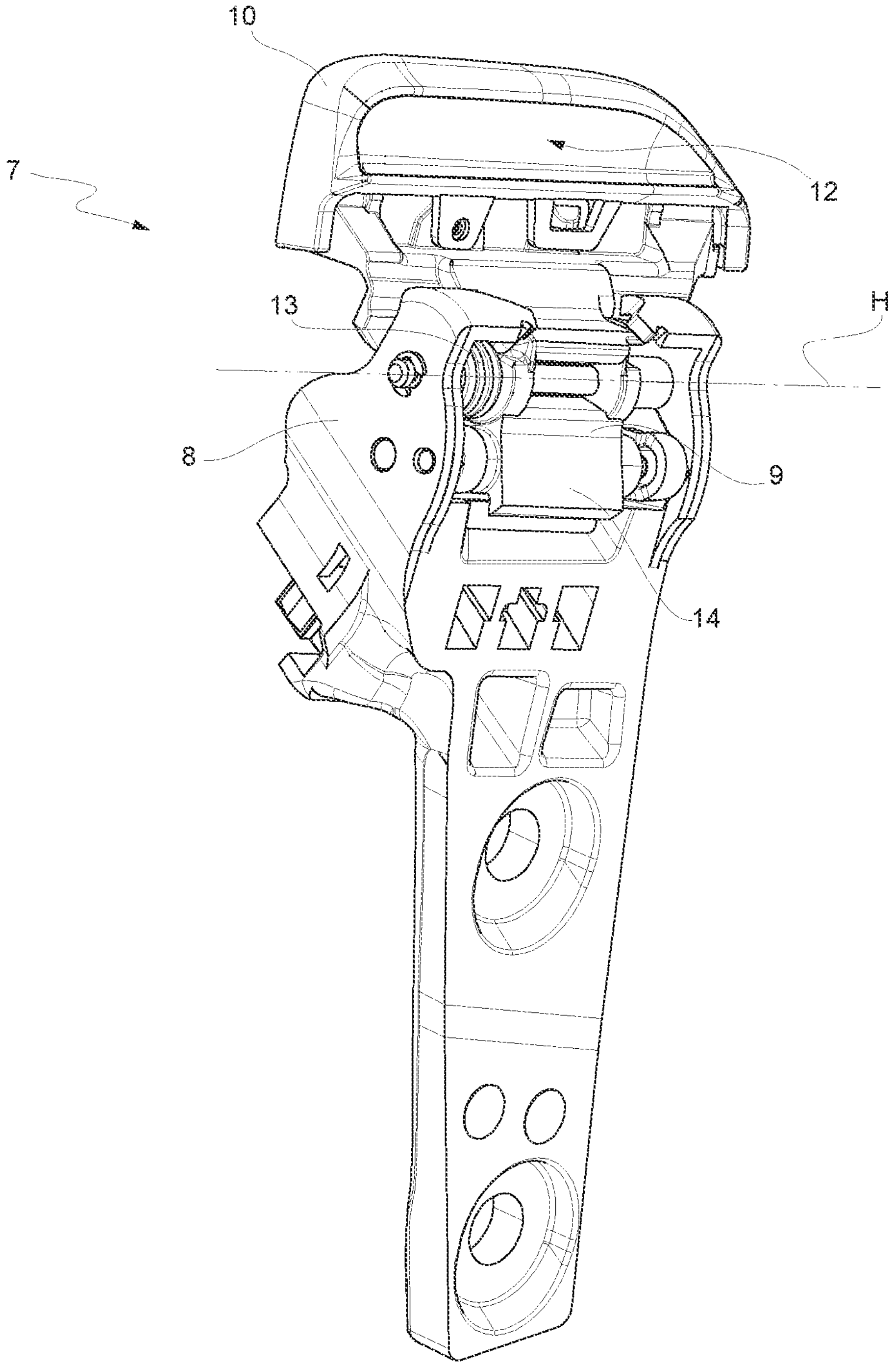
FIG. 4 is a further perspective view of the handle from a point of view opposite that of FIG. 3.
Figure 5:
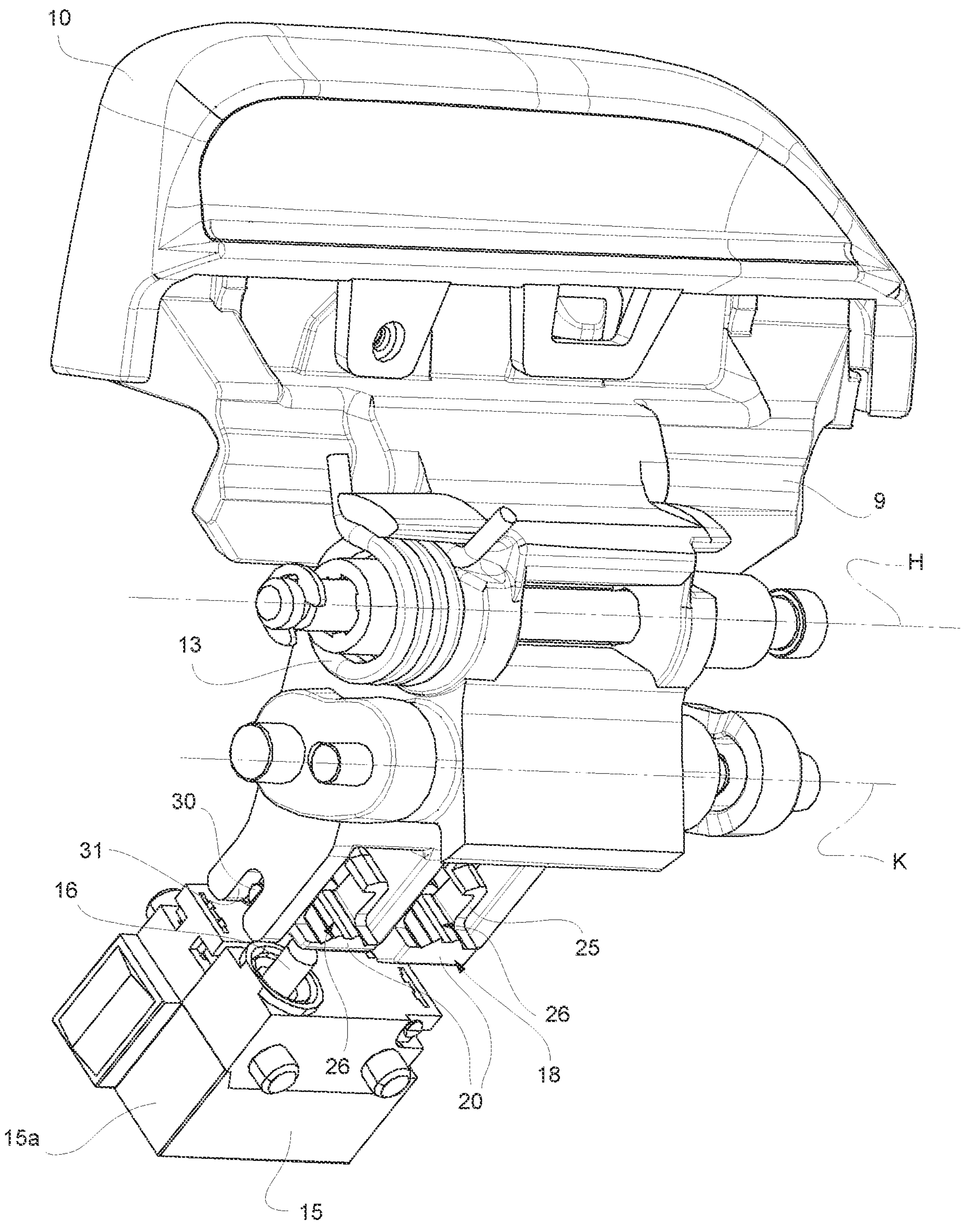
FIG. 5 is a perspective view, from the point of view of FIG. 4, of an enlarged detail of the handle, with parts removed for clarity.
Figure 6:
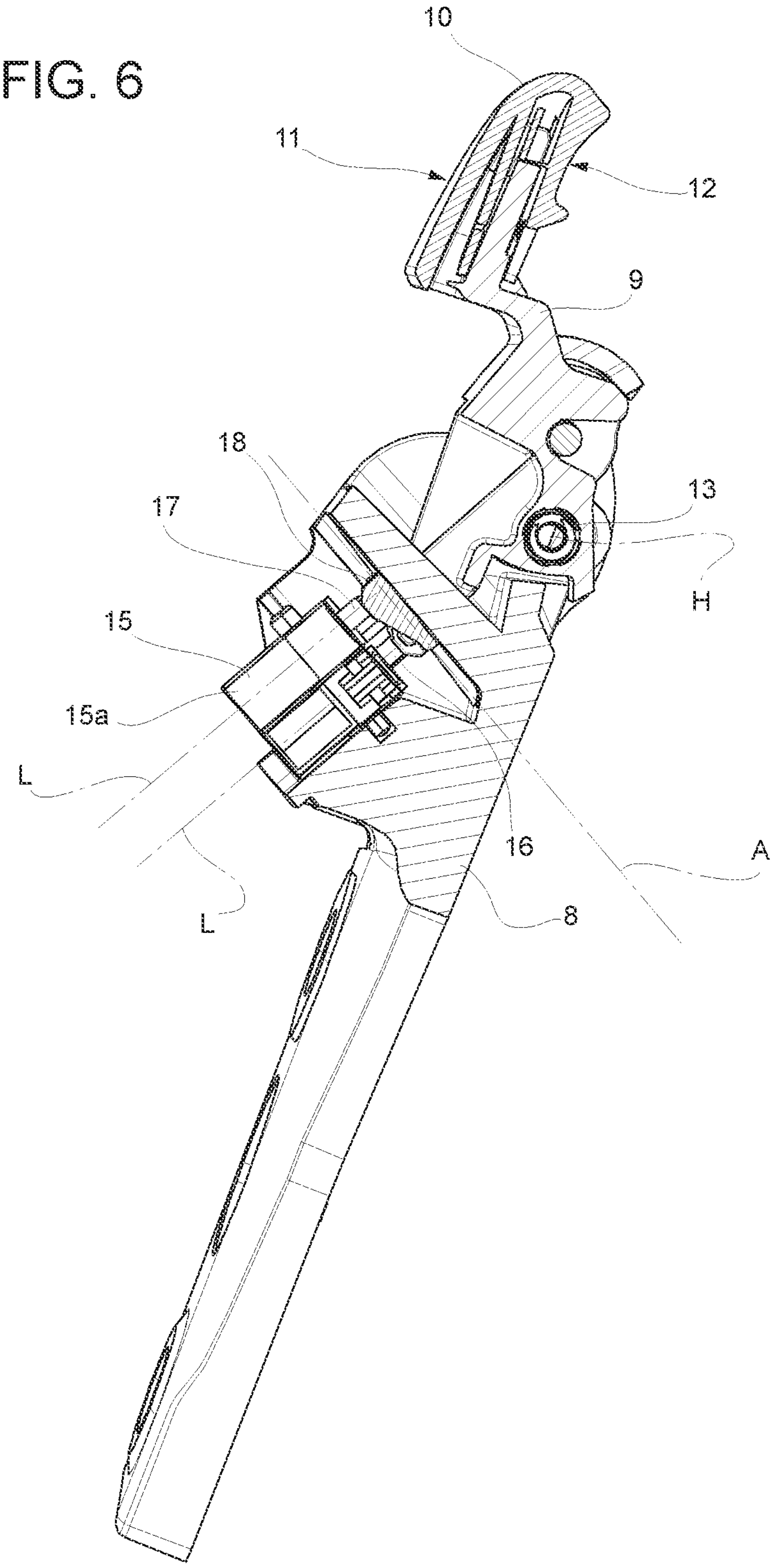
FIG. 6 is a sectional view of the handle in a sectional plane orthogonal to a hinge axis for the handle.
Figure 7:
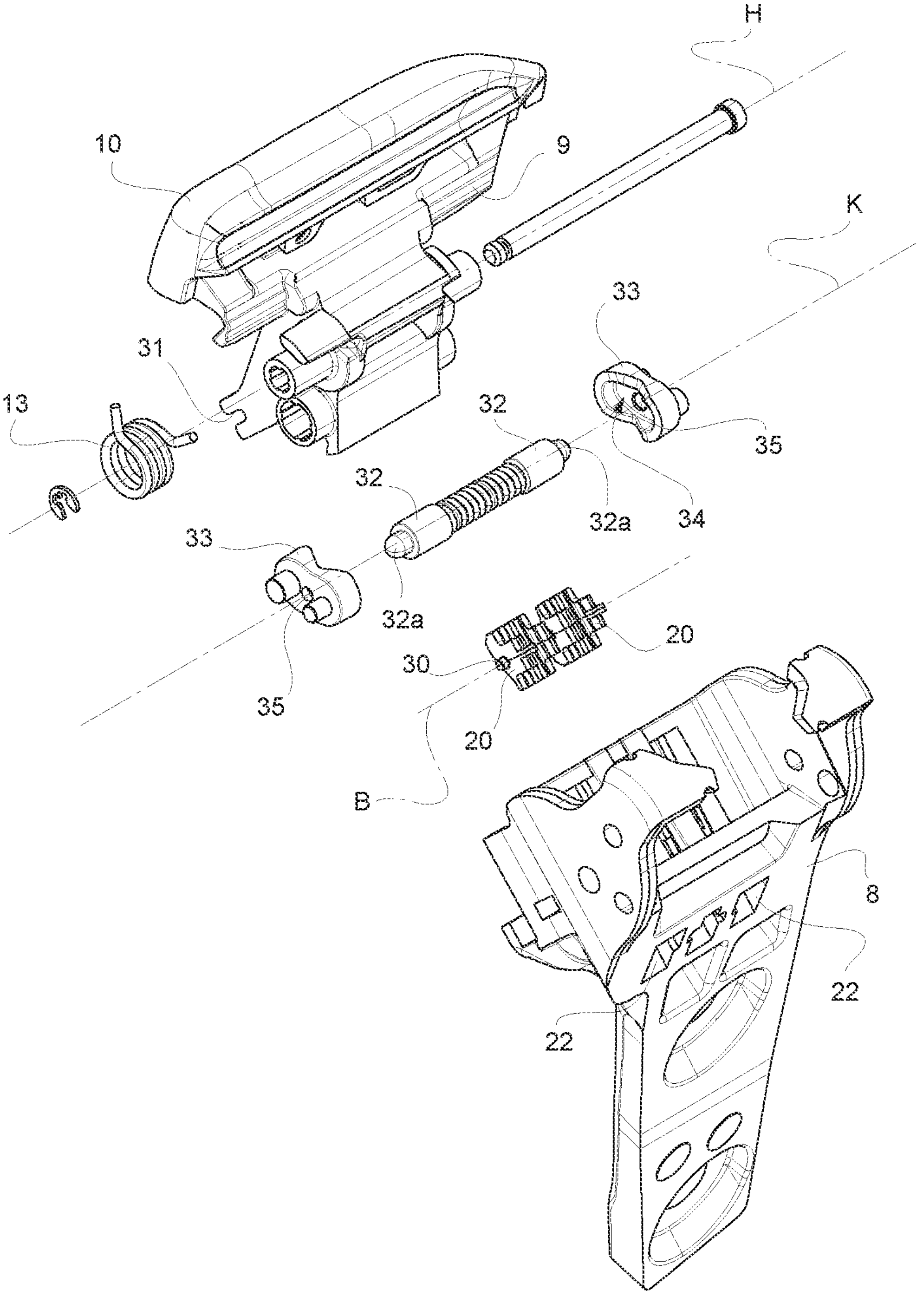
FIG. 7 is an exploded view of the handle.
Figure 8:
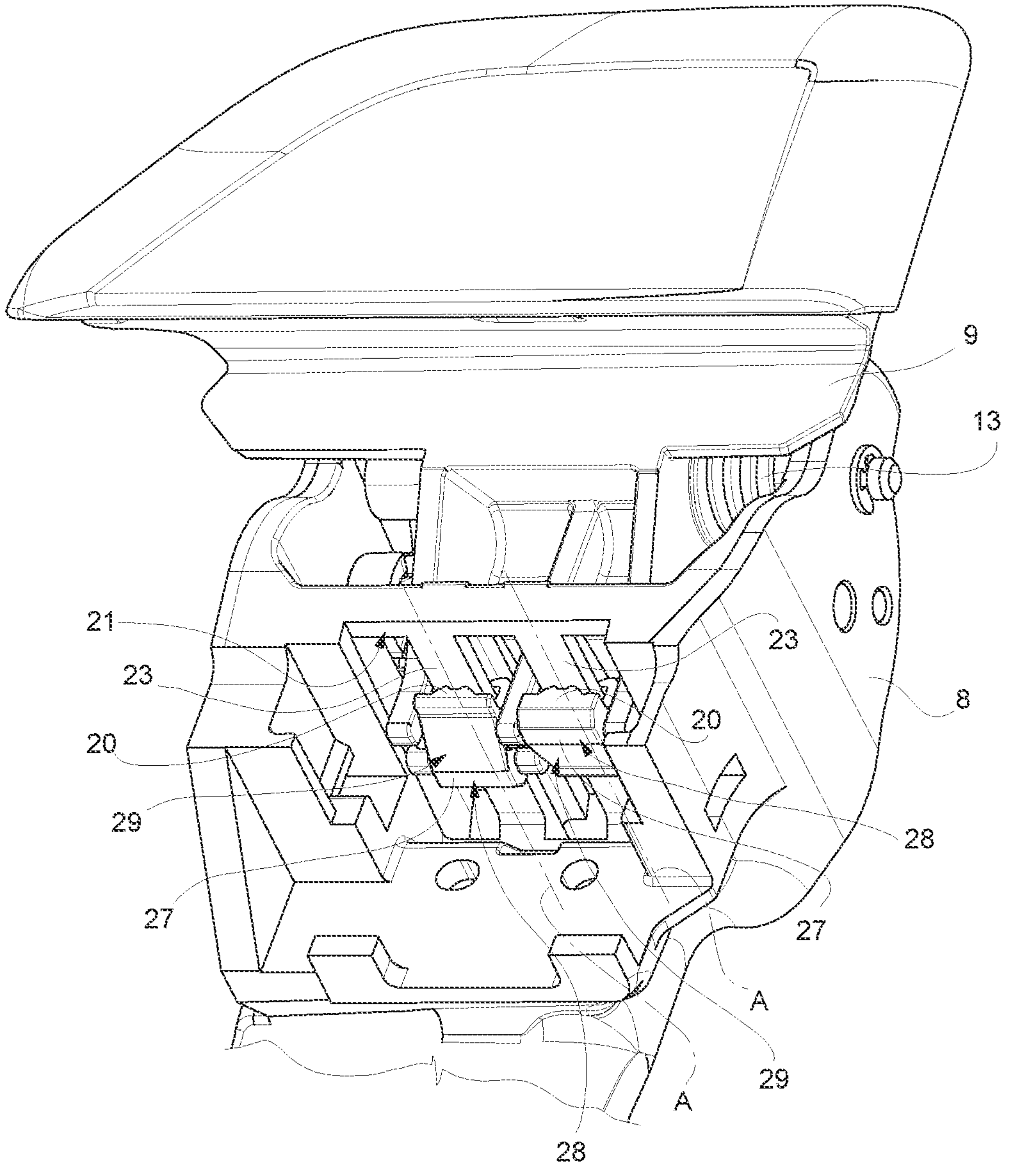
FIG. 8 is a perspective view of a further enlarged detail of the handle, with parts removed for clarity.

In FIG. 1, reference number 1 is used to indicate a motor vehicle as a whole.

Like all motor vehicles, the motor vehicle 1 has a normal forward moving direction and includes a passenger compartment 2 to accommodate at least one driver and possibly one or more passengers.

The motor vehicle 1 further comprises a body 3, which defines the passenger compartment 2 and serves to carry external body elements, i.e., elements visible from the outside of the motor vehicle 1.

Among the body elements, the motor vehicle 1 comprises a door 4, in the present case a side door, in particular a rear side door according to the forward moving direction of the motor vehicle 1.

The door 4 is coupled to the body 3, in particular by a known-type hinge, not shown, so that it can rotate around a hinge axis transversal to a plane defined by the forward moving direction and a horizontal direction orthogonal thereto.

The door 4 can rotate between two extreme positions defined by an open position and a closed position, respectively, in which the door 4 makes the passenger compartment 2 accessible to a passenger, and vice versa.

A rotation of the door 4 towards the open position corresponds to an opening of the door 4, whereas a rotation of the door 4 towards the closed position corresponds to a closing of the door 4.

In order to open and close the door 4, the motor vehicle 1 comprises an actuator device 5, for example of the electric type, which is only schematically shown in FIG. 1 as it is known per se in the art.

The actuator device 5 can be controlled to open and close the door 4 automatically, i.e., even without any kind of manual intervention, e.g., by the passenger.

The motor vehicle 1 further comprises a control unit 6 configured to control the actuator device 5 so as to trigger the opening or closing of the door 4, i.e., so as to open or close the door 4.

The control unit 6 controls the actuator device 5 so as to open and close the door when it receives or processes two different signals, namely an opening signal and a closing signal, respectively.

How the two signals are generated and sent to the control unit 6 will be clearer in the following by means of the description of a specific handle or handle apparatus 7.

The motor vehicle 1 comprises the handle 7, which in turn comprises a base or attachment portion 8 fixed to the door 4 and a manoeuvrable portion 9 coupled to the attachment portion 8 in a movable manner relative to the attachment portion 8.

Preferably, the attachment portion 8 is hidden by the door 4.

The manoeuvrable portion 9 comprises or is arranged so that it has one end 10 protruding relative to the door 4, e.g., upwards.

The body 3, in particular, defines an empty compartment or volume containing the end 10.

More particularly, the end 10 has an external face 11 facing the outside of the motor vehicle 1, for example arranged flush with an external surface of the door 4.

In addition, the end 10 has an internal face 12 facing the passenger compartment 2 or the body 3. Conveniently, the internal face 12 is shaped ergonomically to facilitate the manual grip of the manoeuvrable portion 9 from the inside of the compartment containing the end 10.

The compartment is configured for, i.e., it is sized to allow the passenger to insert his/her fingers between the end 10 or in particular between the internal face 12 and a wall of the body 3 defining the compartment.

For example, the fingers can be inserted from above, whereby the end 10 can be grasped by closing the hand with the back facing upwards, such that the palm and fingers of the hand are in contact with the external face 11 and the internal face 12, respectively.

The manoeuvrable portion 9 is movable between at least three distinct positions, including a neutral position (FIG. 13) and two activation positions, in particular to trigger the opening and closing of the door 4, respectively, through the control of the actuator device 5 by means of the control unit 6.

Figure 13:
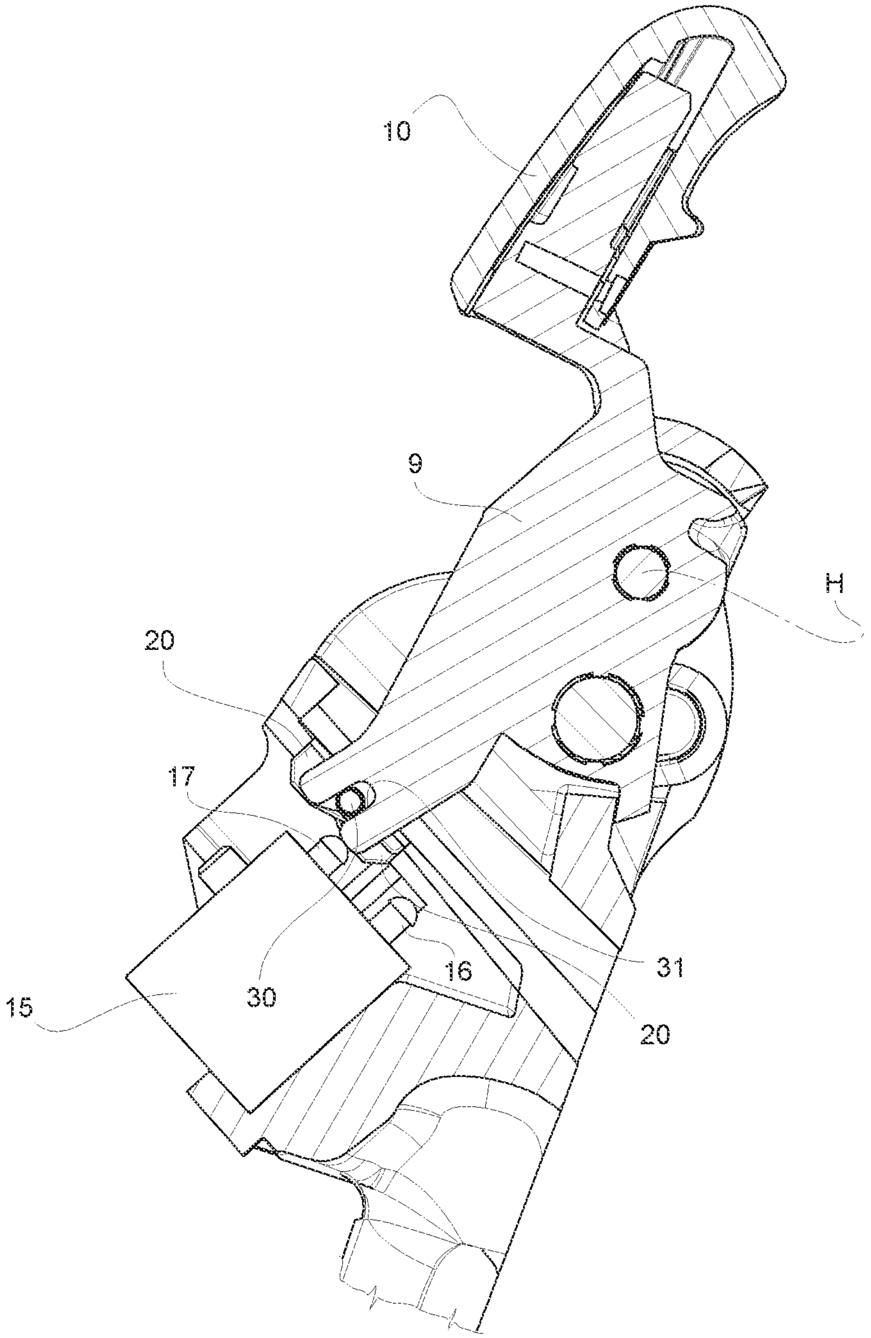
Figure 14:
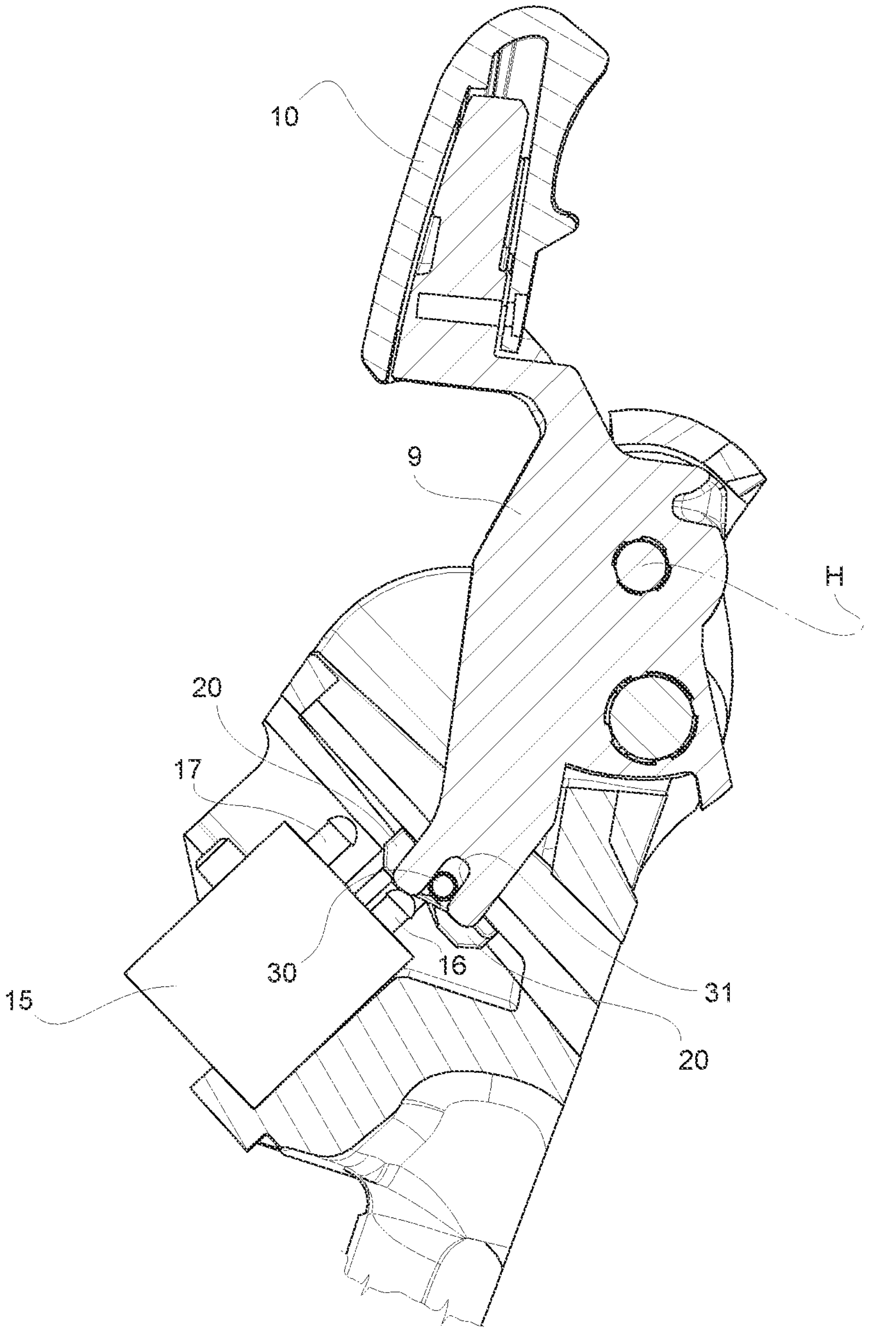

Therefore, the activation positions will be referred to below as a closing request position and an opening request position, respectively (FIGS. 13 and 14, respectively).

In greater detail, the manoeuvrable portion 9 is hinged to the attachment portion 8 about a hinge axis H.

Therefore, the manoeuvrable portion 9 can rotate about the axis H.

In particular, the hinge axis H extends parallel to the forward moving direction of the motor vehicle 1. In other words, the hinge axis H is orthogonal to a plane transversal to the door 4 or more in particular to the faces 11, 12.

Specifically, a movement of the manoeuvrable portion 9 towards the opening request position (FIG. 14) takes place in a direction opposite to that of a movement towards the closing request position (FIG. 13).

In particular, the two aforementioned movements can take place starting from the neutral position, for example up to the opening request position and the closing request position, respectively.

In other words, the neutral position is an intermediate position between the opening request position and the closing request position.

In the embodiment shown, a counterclockwise rotation of the manoeuvrable portion 9 from the neutral position (FIG. 12) is directed towards the opening request position (FIG. 14). Clearly, on the other hand, a clockwise rotation of the manoeuvrable portion 9 from the neutral position (FIG. 12) is directed towards the closing request position (FIG. 13).

Thus, a user pulling the manoeuvrable portion 9 towards himself/herself wishes to open the door 4, whereas a user pushing the manoeuvrable portion 9 wishes to close the door 4.

The neutral position (FIG. 12) defines an equilibrium position for the manoeuvrable portion 9.

In view of the above, the handle 7 comprises an elastic device 13, for example comprising a torsional spring shown in the figures, configured to exert an elastic reaction upon the manoeuvrable portion 9 towards the neutral position in response to a displacement from the neutral position.

Therefore, the elastic reaction is zero when the manoeuvrable portion 9 is in the neutral position, i.e., in the equilibrium position. On the other hand, the elastic reaction towards the neutral position increases, in particular linearly, as the manoeuvrable portion 9 moves away from the neutral position, more particularly towards the opening request position or the closing request position.

In practice, the elastic device 13 couples the manoeuvrable portion 9 to the attachment portion 8. In other words, the manoeuvrable portion 9 is coupled to the attachment portion 8 by means of the elastic device 13.

In the embodiment shown, the elastic reaction comprises an elastic reaction torque acting on the manoeuvrable portion 9 about the hinge axis H. More particularly, the torsional spring shown is arranged about the axis H.

Furthermore, in the embodiment shown, the attachment portion 8 and the manoeuvrable portion 9, respectively, comprise two abutment walls, not shown, and a stop portion or block 14, which abuts or is arranged so that it abuts against the abutment walls, respectively, when the manoeuvrable portion 9 reaches corresponding end-of-travel positions, which may, for example, coincide with the opening request position and the closing request position.

However, in the present case, the opening request position is between the neutral position and one of the end-of-travel positions, just like the closing request position is between the neutral position and the other of the end-of-travel positions.

The abutment walls define respective mechanical ends of travel for the movement or more precisely the rotation of the manoeuvrable portion 9. However, this is not strictly limiting, as the handle 7 could also have included special electromechanical limit switches of a known type with the function of limiting the travel or stroke of the manoeuvrable portion 9, for example, between the opening request position and the closing request position.

In addition, the handle 7 comprises a transducer device 15 configured to detect a movement of the manoeuvrable portion 9 reaching the opening request position (FIG. 14) and to generate an opening signal to trigger the automatic opening of the door 4 by means of the device 5 when the latter movement is detected.

Moreover, the transducer device 15 is also configured to detect a movement of the manoeuvrable portion 9 reaching the closing request position (FIG. 13) and to generate a closing signal to trigger the automatic closing of the door 4 by means of the device 5 when the latter movement is detected.

In the present case, the opening request position and the closing request position (FIGS. 14 and 13, respectively) are distinct from the end-of-travel positions, therefore, the detected movement of the manoeuvrable portion 9 can continue beyond the opening request position or the closing request position towards the corresponding end-of-travel position. Otherwise, if for example the opening request position and the closing request position coincide with the end-of-travel positions, the detected movement would be up to the opening request position or the closing request position.

In any case, the transducer device 15 detects the moment when the manoeuvrable portion 9 reaches the opening request position or the closing request position and consequently generates the signal, for example instantaneously or after a time interval, which may be predetermined or settable.

In addition, each of the detected movements can start from the neutral position or any other intermediate position, for example between the neutral position and the opening request position, or between the neutral position and the closing request position.

The transducer device 15 is supported by the attachment portion 8 and preferably comprises at least one fixed portion 15*a* relative to the attachment portion 8.

In greater detail, the transducer device 15 comprises two distinct sensitive elements 16, 17 to detect the moment when the manoeuvrable portion 9 reaches the opening request position and the closing request position, respectively.

In particular, the handle 7 comprises a feeler device 18 coupled to the manoeuvrable portion 9 so that it touches or cooperates in contact with the sensitive elements 16, 17, respectively, when the manoeuvrable portion 9 reaches the opening request position and the closing request position.

More particularly, the sensitive elements 16, 17 are coupled to the fixed portion 15*a* in a movable manner relative thereto, such that the feeler device 18 moves one of the sensitive elements 16, 17 while cooperating in contact with it.

In the embodiment shown, the sensitive elements 16, 17 comprise respective buttons movable along respective straight axes L.

Therefore, the feeler device 18 is configured to press the buttons during the movements of the manoeuvrable portion 9.

When pressed, the buttons move along respective axes L under the pressure of the feeler device 18, which in turn is driven by the movements of the manoeuvrable portion 9.

Thus, each button reaches a position that triggers the generation of either the opening signal or the closing signal when the manoeuvrable portion 9 reaches the opening request position and the closing request position, respectively.

More generally, the movement of the manoeuvrable portion 9 reaching the opening request position corresponds to a movement of the sensitive element 16 by means of the feeler device 18, where the latter movement of the sensitive element 16 triggers the generation of the opening signal.

Similarly, the movement of the manoeuvrable portion 9 reaching the closing request position corresponds to a movement of the sensitive element 17 by means of the feeler device 18, where the latter movement of the sensitive element 17 triggers the generation of the opening signal.

The triggering of the signal as such can take place in many ways known per se, for example because the movements of the sensitive elements 16, 17 close respective electrical circuits or by means of sensors of the transducer device 15, such as potentiometers.

Furthermore, the sensitive elements 16, 17 can continue to cooperate with the feeler device 18 and thus move according to the movement of the manoeuvrable portion 9 even after reaching their respective positions in which the generation of the opening or closing signal is triggered. Similarly, the cooperation and hence the movement of the sensitive elements 16, 17 can clearly occur even before the positions in which the generation of the opening or closing signal is triggered are actually reached.

Preferably, the feeler device 18 comprises or is defined by a slide assembly, which may include one or more slides 20.

To guide the slides 20, the handle 7 comprises a guide device 21, which constrains the slides 20 to translate along a straight direction A.

More precisely, direction A extends in a plane orthogonal to the hinge axis H. Furthermore, in detail, the plane is also orthogonal to the forward moving direction of the motor vehicle 1; therefore, direction A is transversal to the door 4.

In detail, the guide device 21 comprises one or more guides 22 which respectively guide the slides 20 along direction A. The guides 22 are fixed relative to the attachment portion 8.

In particular, a guide 22 comprises at least two flat walls parallel to each other and to the plane including direction A so as to define a corridor along direction A. In addition, more particularly, the guide 22 comprises a strip 23 orthogonal to the plane including direction A, arranged between the flat walls, and extending along direction A.

A slide 20 comprises a base block 24, adapted to cooperate with one of the sensitive elements 16, 17, and preferably two arms 25 extending from the base block 24 crosswise relative to a face 26 of the base block 24, wherein the face 26 is transversal to the plane including direction A. The arms 25 have respective hooked ends with which they clasp the strip 23. The face 26 also exists in the absence of the arms 25.

In practice, according to a cross-section of the strip 23, i.e., in a plane orthogonal to direction A, the arms 25 are arranged at the sides of the strip 23.

The face 26 faces the strip 23.

Therefore, the arms 25 and consequently the slide 20 can slide on the strip 23 along direction A because the slide 20 is constrained to slide along the corridor by the parallel walls.

The base block 24 also has a bottom 27 facing the opposite side relative to the face 26, as well as two opposite ends along direction A, i.e., a head and a tail. The ends are transversal to direction A.

The bottom 27 is intended to cooperate in contact with one of the sensitive elements 16, 17.

The bottom 27 can have a surface 28 which is at a maximum distance from the face 26. Also, the bottom 27 can have a flat face 29 inclined relative to the surface 28 towards one of the ends 29*a* of the base block 24 or towards the face 26.

The face 29 faces one of the sensitive elements 16, 17. The face 29 is inclined relative to a plane orthogonal to direction A. For the sake of clarity, in particular, the term inclined herein excludes the meaning of orthogonal, whereby the angle of inclination is different from a null angle, a straight angle, and a right angle. In addition, the face 29 can also be incident to direction A.

In the embodiment shown, the slide assembly comprises two slides 20 with respective base blocks 24, which however are oriented differently from each other.

The faces 29 are inclined in an opposite way or more precisely in a symmetrical way relative to a plane orthogonal to direction A. The faces 29 respectively face the sensitive elements 16, 17.

In particular, the base blocks 24 are symmetrical relative to the plane orthogonal to direction A, i.e., flipped relative to each other by a straight angle around an axis orthogonal to direction A and transversal to the face 26.

Therefore, the sensitive elements 16, 17 are on opposite sides of the plane orthogonal to direction A.

The slides 20 or the slide assembly are/is coupled to the manoeuvrable portion 9 by means of suitable coupling elements forming part of the handle 7.

The coupling elements are configured to transmit the movements of the manoeuvrable portion 9 to the slides 20 or to the slide assembly, so that the slides 20 or the slide assembly have/has translations corresponding to the movements.

In particular, the slides 20 perform equal translations in response to the movement of the manoeuvrable portion 9. In other words, the slides 20 move jointly and coherently together.

The coupling elements comprise, in particular for each of the slides 20, a pin 30, which is fixed relative to the slide 20, and a guide slot 31 obtained in the manoeuvrable portion 9.

The pin 30 extends along an axis B parallel to the hinge axis H, therefore orthogonal to the plane including direction A.

The guide slot 31 is sized to slide relative to the pin 30 in a direction orthogonal to the axis B and to direction A. In other words, the outer surface of the pin 30 is in contact with the manoeuvrable portion 9 within the guide slot 31 in two diametrically opposite points relative to the axis B.

Thus, the manoeuvrable portion 9 forms a crank and slotted link around the pin 30.

The pin 30 is constrained to translate along direction A because it is fixed in relation to the slide 20, which in turn is constrained by the guide 22.

Movements of the manoeuvrable portion 9 towards the opening request position and towards the closing request position correspond, via the coupling elements, to translations of the slides 20 or of the slide assembly along distinct paths.

The sensitive elements 16, 17, respectively, are arranged along these distinct paths so that they can come into contact with the slides 20 or with the slide assembly.

Therefore, the sensitive elements 16, 17 are arranged in respective distinct positions such that said sensitive elements 16, 17 cooperate in contact with the slide assembly or with the slides 20 during their translations corresponding to the movements of the manoeuvrable portion 9 towards the opening request position and towards the closing request position.

This can also be clearly derivable from the explanations provided in the description of the feeler device 18, which may in particular be part of the slide assembly or include the same slide assembly or even be defined by it.

As mentioned above, the neutral position of the manoeuvrable portion 9 is an equilibrium position. Although the elastic device 13 is calibrated or configured to return the manoeuvrable portion 9 to the neutral position after a movement thereof, as well as to maintain the neutral position in the absence of movements applied by a user, it is preferable to provide, alternatively or additionally, an assembly that slightly hampers the movement of the manoeuvrable portion 9 from the neutral position.

For this purpose, the handle 7 comprises a centring pin 32 carried by the manoeuvrable portion 9 in a sliding manner along a straight axis K.

In detail, the axis K is parallel to the hinge axis H.

Moreover, the handle 7 also comprises an abutment element 33 for the centring pin 32; the abutment element 33 is fixed relative to the attachment portion 8 and has an abutment surface 34 facing one end 32*a* of the centring pin 32.

When the manoeuvrable portion 9 is in the neutral position, the axis K is also the axis of a recess 35 of the abutment surface 34.

The recess 35 defines a seat for receiving the end 32*a* of the centring pin 32.

The centring pin 32 is carried by the manoeuvrable portion 9 in a position such that the end 32*a* of the centring pin 32 is accommodated in the recess 35 when the manoeuvrable portion 9 is in the neutral position. In other words, in the neutral position of the manoeuvrable portion 9, the length of the centring pin 32 is such that its end is accommodated in the recess 35.

The position of the end 32*a* of the centring pin 32 inside the recess 35 is a rest position for the centring pin 32.

Furthermore, the handle 7 comprises an additional elastic device 36 configured to exert an elastic reaction upon the centring pin 32 along the axis K towards the abutment surface 34 at least in response to a displacement of the end 32*a* of the centring pin 32 from the rest position.

In practice, at least as a result of the displacement, the reaction of the elastic device 36 pushes the end 32*a* of the centring pin 32 against the abutment surface 34.

This implicitly means that a profile of the recess 35, which can be obtained by transversally sectioning the abutment element 33 in a plane including the axis K and orthogonal to the plane including direction A, allows the end 32*a* of the centring pin 32 to come out of the recess in response to a force applied to the manoeuvrable portion 9 in order to move the latter towards the opening request position or the closing request position.

This applies despite the presence of the elastic device 36, which reacts elastically against the coming out of the recess 35.

In particular, the end 32*a* of the centring pin 32 has a hemispherical shape or is in any case concave towards an intermediate zone of the centring pin 32.

When the force is applied to the manoeuvrable portion 9, the profile of the recess 35 receives at least part of the same force and reacts statically with a further equal and opposite force. The latter force applied to the concave end of the centring pin 32 has a component along the axis K in the opposite direction to that of the elastic reaction of the elastic device 36.

The component releases the centring pin 32 from the recess 35.

At this point, the end 32*a* of the centring pin 32 is pressed by the elastic element against the remaining part of the abutment surface 34 outside the recess 35.

In the present case, the remaining part is a flat surface, although this is not necessary. On the contrary, the remaining part could have non-flat portions, e.g., such that the centring pin 32 is moved away from the recess 35 along the axis K, i.e., increasing the elastic reaction of the element 36 and hence the friction between the abutment surface 34 and the centring pin 32.

In this way, the shape of the abutment surface 34 can be used to adjust the friction and thus to adjust the feeling of opposition to the movement of the manoeuvrable portion 9 that the passenger receives when he/she moves the manoeuvrable portion 9.

In the embodiment shown, the handle 7 comprises two centring pins 32 and two abutment elements 33 arranged opposite each other along the axis K. In other words, the centring pins 32 as well as the abutment elements 33 are arranged symmetrically relative to a plane, in particular a centre plane, orthogonal to the axis K.

Figure 9:
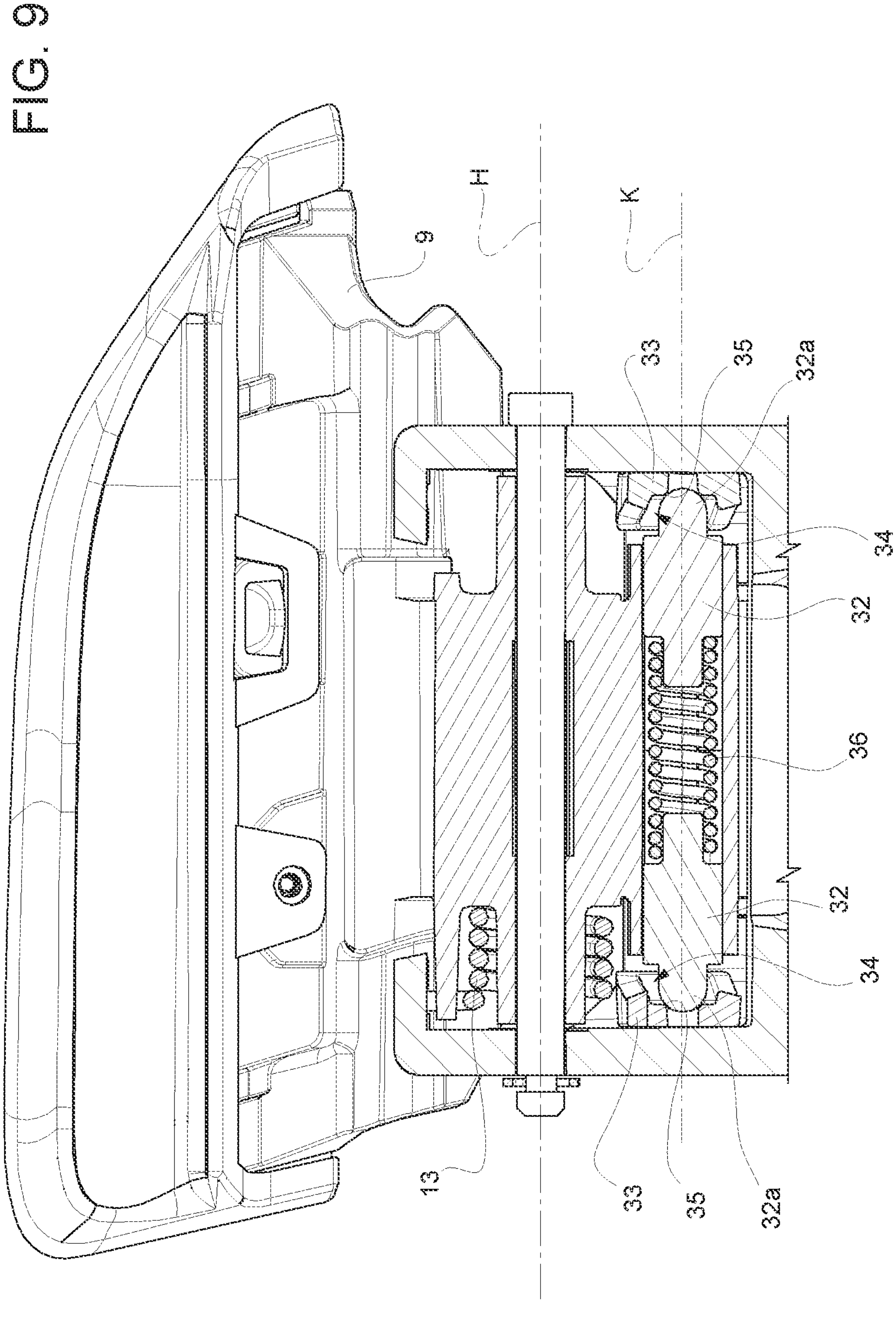
FIG. 9 is a sectional view of the handle in a sectional plane orthogonal to the sectional plane of FIG. 6 and including the hinge axis.
Figure 10:
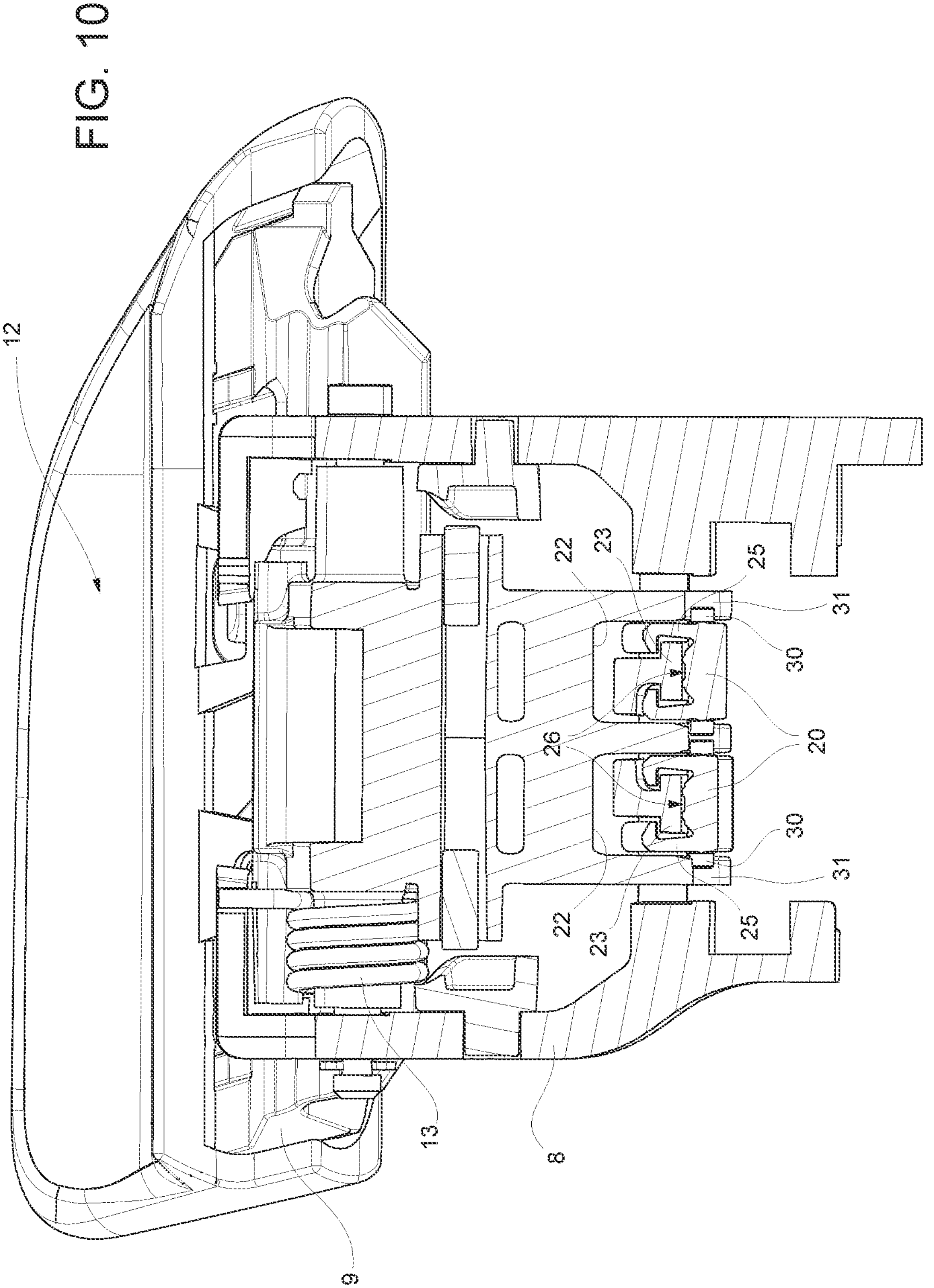
FIG. 10 is a sectional view of the handle in a sectional plane parallel to the sectional plane of FIG. 9.
Figure 11:
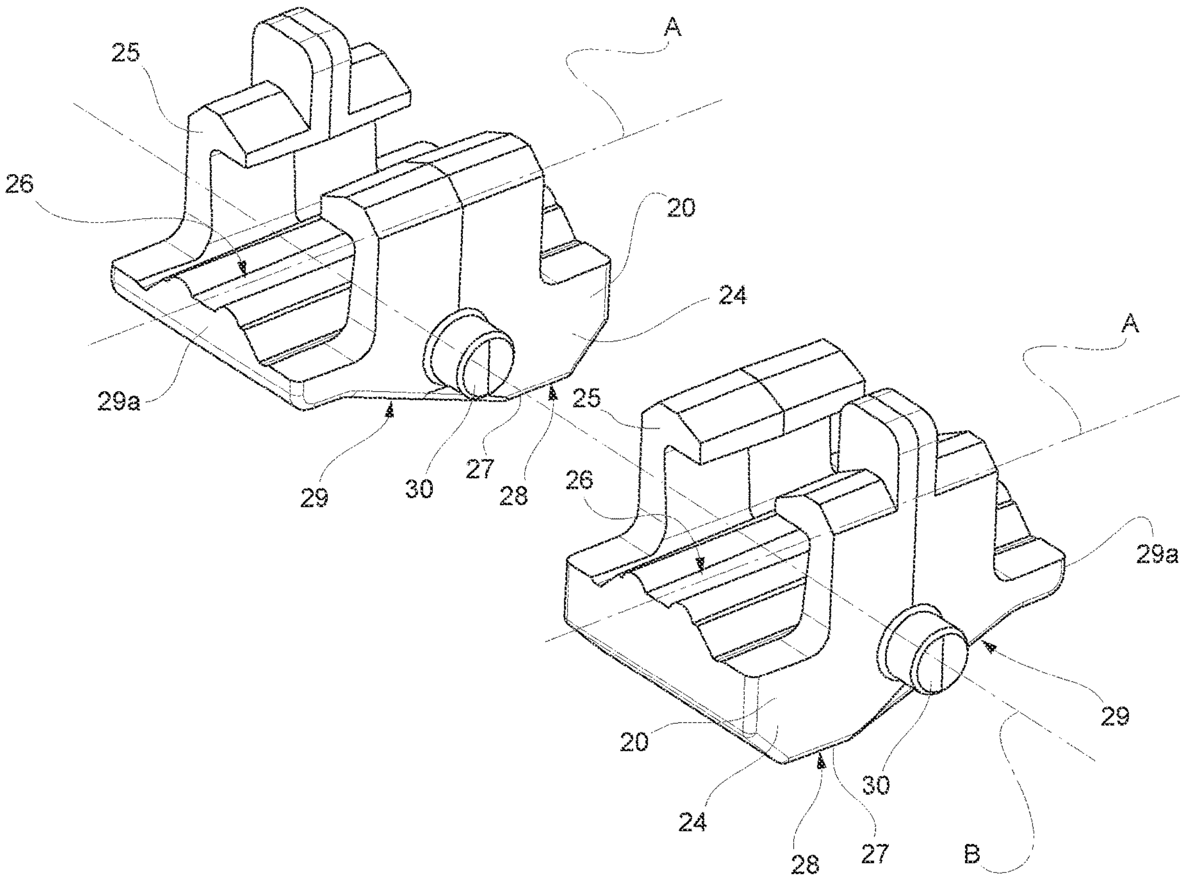
FIG. 11 is a perspective view of a slide assembly forming part of the handle.
Figure 12:
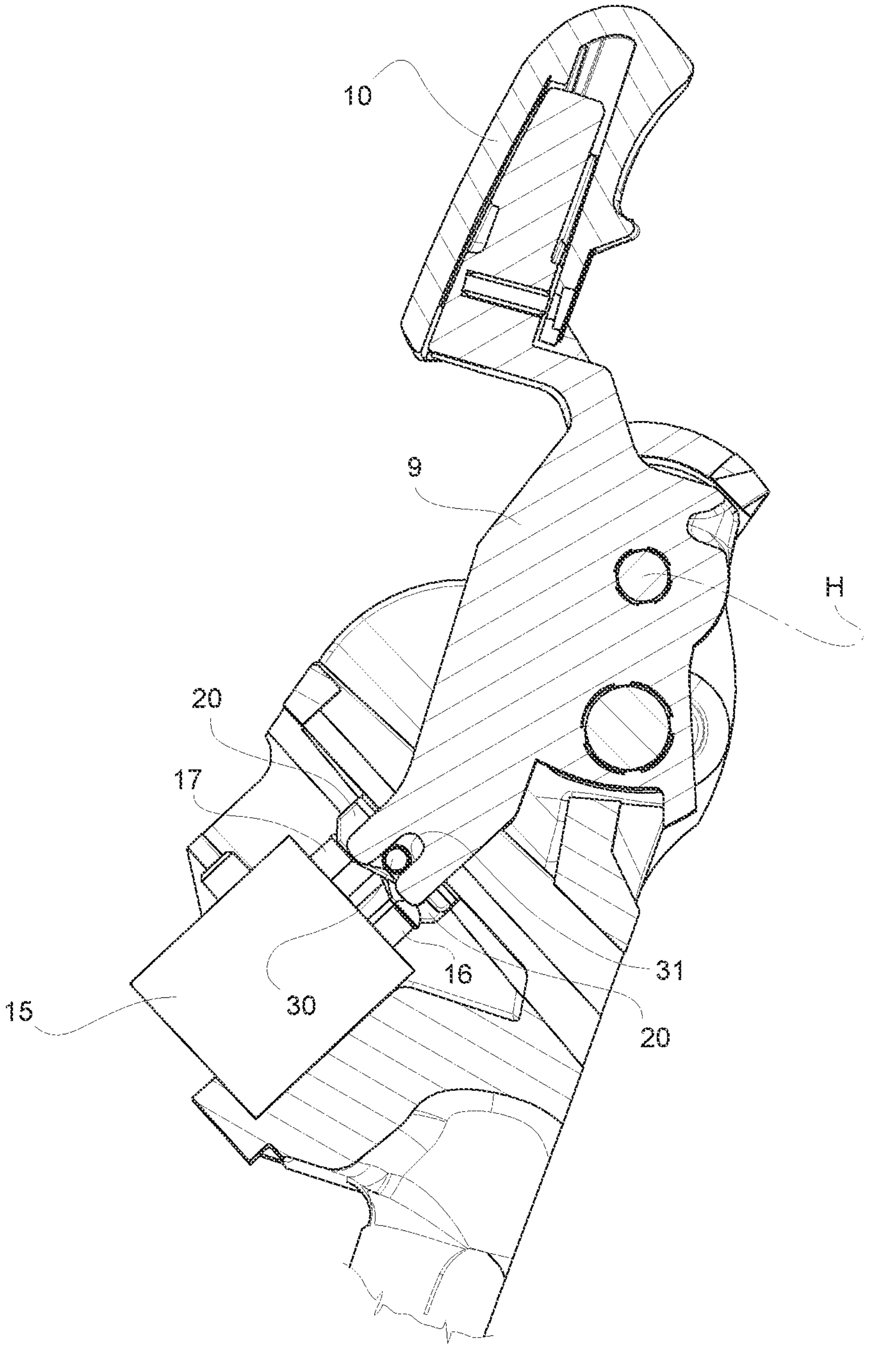
FIGS. 12, 13, 14 are sectional views of the handle depicting respective operating conditions of the handle and in a sectional plane parallel to the sectional plane of FIG. 6.

The elastic device 36 comprises an axial spring compressed between the centring pins 32. The axial spring can be at rest or preloaded when the manoeuvrable portion is in the neutral position (FIGS. 9 and 12).

The elastic reaction of the axial spring is equal and opposite for the two centring pins 32, the ends of which are pushed towards their respective abutment elements 33.

As an alternative to the above, the elastic device 36 could also optionally couple one of the centring pins 32 to the manoeuvrable portion 9 in an elastically yielding manner along the axis K.

In the following, the operation of the handle 7 will be described with reference to a request to close the door 4. The request to open the door 4 is specular and will therefore not be described in detail.

The passenger pushes the manoeuvrable portion 9 to cause it to rotate clockwise about the hinge axis H; in particular, the passenger presses on the face 11.

The manoeuvrable portion 9 remains stationary in the neutral position (FIG. 12) until the passenger's pressure reaches a force sufficient to cause the centring pins 32 to come out of the recesses 35.

At this point, the force required to move the manoeuvrable portion 9 from the neutral position to the closing request position (FIG. 13) increases substantially linearly due to the opposite elastic reaction of the elastic device 13.

One of the slides 20 comes into contact with the sensitive element 17. Here, the resistance of the manoeuvrable portion to move towards the closing request position increases until the sensitive element 17 is moved.

Here, the condition of static friction between the slide 20 and the sensitive element 17 becomes a condition of dynamic friction, whereby the passenger perceives a sensation of decreased resistance to movement.

The sensation of resistance can clearly be modified by varying, for example, the inclination of the face 29. In addition, the base block 24, or rather the bottom 27, could even include an additional flat face inclined relative to the face 29 and adjacent thereto with a different inclination. The inclinations can be used to adjust the resistance of the manoeuvrable portion 9 to movement.

When the manoeuvrable portion 9 reaches the closing request position (FIG. 13), the transducer device 15 generates the closing signal. The closing signal is then received by the control unit 6, which consequently controls the actuator device 5 to close the door 4.

In particular, the door 4 is closed completely.

The advantages of the handle 7 according to the invention are clear from the foregoing.

In particular, the handle 7 can be used in an extremely versatile way to both open and close the door 4.

The opening and closing of the door 4 can therefore take place by means of a single device, i.e., the handle 7.

Despite the dual function of the handle 7, the latter remains extremely simple and effective, as well as convenient for the passenger.

The shape of the abutment surface 34, as well as the inclination of the faces 29 and the characteristics of the elastic element 13 can be easily adjusted so as to affect the perceptions of the passenger when he/she moves the manoeuvrable portion 9 as desired.

The centring pins 32 and the abutment elements 33 are simple but extremely effective in keeping the manoeuvrable portion 9 in the neutral position when the passenger is not using the handle 7.

Lastly, it is clear that modifications and variations may be made to the handle 7 according to the invention, without however departing from the scope of protection defined by the claims.

In particular, the number and shape of the components described and illustrated herein could be different, and in particular varied with great freedom.

The invention claimed is:

1. A handle (7) for a door (4) of a motor vehicle (1), the handle (7) comprising an attachment portion (8) to be fixed to the door (4) of the motor vehicle (1), a maneuverable portion (9) coupled to the attachment portion (8) in a movable manner between at least three distinct positions including a neutral position, a first activation position, and a second activation position, and a transducer device (15) configured to a) detect a first movement of the maneuverable portion (9) reaching the first activation position, b) generate a first signal to trigger an automatic opening of the door (4) by means of an actuator device (5) of the motor vehicle (1) when the first movement is detected, and c) detect a second movement of the maneuverable portion (9) reaching the second activation position, wherein the transducer device (15) is further configured to generate a second signal to trigger an automatic closing of the door (4) by means of the actuator device (5) when the second movement is detected, the handle further comprising:

a slide assembly (20), a guide device (21) constraining the slide assembly (20) to translate along a straight direction (A), and coupling means (30, 31) configured to transmit the first and the second movement to the slide assembly (20), so that the slide assembly (20) consequently has a first and a second translations, respectively, wherein the transducer device (15) comprises a first and a second sensitive element (16, 17) arranged in respective distinct positions such that the first and the second sensitive elements (16, 17) cooperate in contact with the slide assembly (20) during the first and the second translations, respectively, the transducer device (15) being configured to generate the first and the second signal, respectively, when the first and the second sensitive element (16, 17) cooperate in contact with the slide assembly (20), wherein the slide assembly (20) comprises a first portion or first block (24) having a first face (29) inclined relative to a plane orthogonal to the straight direction (A) and facing one of the first and the second sensitive element (16, 17).

2. The handle according to claim 1, wherein the first and the second movement start from the neutral position in respective opposite directions.

3. The handle according to claim 1, further comprising first elastic means (13) configured to exert a first elastic reaction upon the maneuverable portion (9) towards the neutral position in response to a displacement of the maneuverable portion (9) from the neutral position.

4. The handle according to claim 1, wherein the slide assembly (20) further comprises a second portion or second block (24) having a second face (29) inclined relative to said orthogonal plane in a way that is contrary to the first face (29) and facing the other one of the first and the second sensitive element (16, 17).

5. The handle according to claim 1, wherein the maneuverable portion (9) is hinged to the attachment portion (8) about a hinge axis (H).

6. A motor vehicle (1) comprising
a door (4),
the handle (7) according to claim 1, with the attachment portion (8) fixed to the door (4),
a control unit (6) coupled to the transducer device (15) to receive the first and the second signal, and
the actuator device (5) that can be controlled by the control unit (6) so as to open and close the door (4),
wherein the control unit (6) is configured to control the actuator device (5) so as to open and close the door when it receives the first and the second signal, respectively.

7. A handle (7) for a door (4) of a motor vehicle (1), the handle (7) comprising
an attachment portion (8) to be fixed to the door (4) of the motor vehicle (1);
a maneuverable portion (9) coupled to the attachment portion (8) in a movable manner between at least three distinct positions including a neutral position, a first activation position, and a second activation position;
a transducer device (15) configured to
a) detect a first movement of the maneuverable portion (9) reaching the first activation position,
b) generate a first signal to trigger an automatic opening of the door (4) by means of an actuator device (5) of the motor vehicle (1) when the first movement is detected, and
c) detect a second movement of the maneuverable portion (9) reaching the second activation position,
wherein the transducer device (15) is further configured to generate a second signal to trigger an automatic closing of the door (4) by means of the actuator device (5) when the second movement is detected;
a centering pin (32) carried by the maneuverable portion (9) in a sliding manner along a straight axis (K); and
an abutment element (33) fixed relative to the attachment portion (8) and having an abutment surface (34) facing one end (32*a*) of the centering pin (32) along the straight axis (K),
wherein the abutment surface (34) has a recess (35) defining a seat to receive the end (32*a*) of the centering pin (32), the end (32*a*) of the centering pin (32) being accommodated in the recess (35) in a rest position when the maneuverable portion (9) is in the neutral position, and
wherein the handle (7) comprises second elastic means (36) configured to exert a second elastic reaction upon the centering pin (32) along the straight axis (K) towards the abutment surface (34) at least in response to a displacement of the end (32*a*) of the centering pin (32) from the rest position along the straight axis (K) towards an intermediate zone of the centering pin (32), so that the second elastic reaction pushes the end (32*a*) of the centring pin (32) against the abutment surface (34).

8. The handle according to claim 7, wherein the first and the second movement start from the neutral position in respective opposite directions.

9. The handle according to claim 7, further comprising first elastic means (13) configured to exert a first elastic reaction upon the maneuverable portion (9) towards the neutral position in response to a displacement of the maneuverable portion (9) from the neutral position.

10. The handle according to claim 7, wherein the slide assembly (20) further comprises a second portion or second block (24) having a second face (29) inclined relative to said orthogonal plane in a way that is contrary to the first face (29) and facing the other one of the first and the second sensitive element (16, 17).

11. The handle according to claim 7, wherein the maneuverable portion (9) is hinged to the attachment portion (8) about a hinge axis (H).

12. A motor vehicle (1) comprising
a door (4),
the handle (7) according to claim 7, with the attachment portion (8) fixed to the door (4),
a control unit (6) coupled to the transducer device (15) to receive the first and the second signal, and
the actuator device (5) that can be controlled by the control unit (6) so as to open and close the door (4),
wherein the control unit (6) is configured to control the actuator device (5) so as to open and close the door when it receives the first and the second signal, respectively.

* * * * *